UNITED STATES PATENT OFFICE.

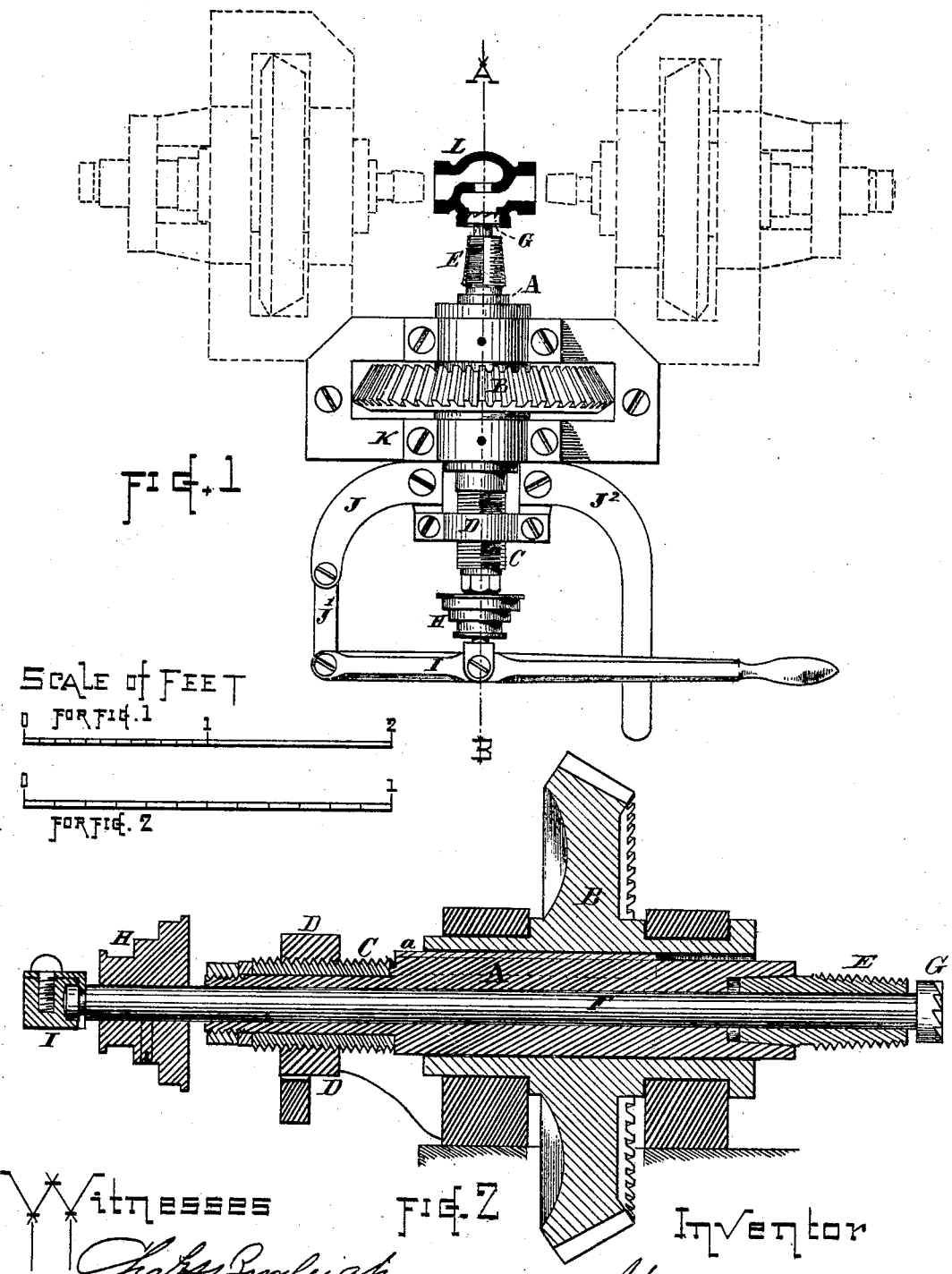

JOHN GUNN, OF WEBSTER, MASSACHUSETTS.

IMPROVEMENT IN MACHINES FOR BORING AND TAPPING VALVES.

Specification forming part of Letters Patent No. 132,396, dated October 22, 1872.

*To all whom it may concern:*

Be it known that I, JOHN GUNN, of Webster, in the county of Worcester and Commonwealth of Massachusetts, have invented certain new and useful Improvements in Machines for Boring and Tapping Valves; and I do hereby declare that the following is a full, clear, and exact description of the same, reference being had to the accompanying drawing which forms a part of this specification, in which—

Figure 1 represents a plan view of my improved mechanism for boring and tapping valves, and Fig. 2 represents, on an enlarged scale, a central vertical section of the tapping-spindle and its operating-gear at line A B, Fig. 1.

The nature of my invention consists in the combination of mechanism for tapping the opening or openings and boring out the seat of the valve at the same time, as hereafter described.

In the drawing, the part marked A represents the tapping-spindle, which spindle is formed hollow and is fitted to the interior of the hub of the driving-gear B, by means of a spline, $a$, in such a manner that it can move longitudinally through the hub while it is caused to revolve therewith. C indicates a screw-quill, arranged upon the rear end of the spindle A, which is turned off for its reception; this screw-quill C works in a screw-clamp, D, and serves as a feeding-screw for moving forward the tap E, which latter is also formed hollow and is fitted to the front end of the spindle, as shown. Through the center of the spindle A and tap E there is arranged a shaft, F, having at its front end a cutter, G, and at its rear end a pulley, H, while beyond the pulley H the extremity of the shaft is attached by a loose coupling to a hand-lever, I, by means of which the shaft can be readily moved longitudinally in the hollow spindle A. The lever I is fulcrumed upon a projecting link, $J^1$, pivoted to the end of an arm, J, which extends back from the head-block K, or frame whereon the driving-gear and spindles are supported, and another arm, $J^2$, extends back from the opposite side of the head-block for supporting the forward end of the lever I, as illustrated in the drawing. The shaft F and cutter G are revolved by means of a belt running on the pulley H from suitably-arranged driving mechanism; and the tap-spindle A and tap E are revolved by means of the gear B. The head-block K is designed to be mounted upon the bed of a tapping-machine, such as is described in my application for Letters Patent for improved tapping-machines, of even date herewith; and tapping mechanism of similar construction, and operating in like manner to that described, is to be used in connection therewith, for tapping the end openings of the valves, as indicated in the drawing, Fig. 1, by dotted lines. The cutter G may be made of any desired form to suit the shape of the valve-seat, and of a size sufficient to correspond to the opening in the valve. The valve L to be bored and tapped is held in a suitable vice or chuck in the position indicated in Fig. 1, and the machine being set in motion the operator moves forward the cutter G, by means of the hand-lever I, and said cutter bores out the opening in front of the tap E, which latter is fed forward by the screw-quill C; and by further pressure on the lever the cutter is caused to smooth off the surface and shape the opening of the valve-seat while the tap E is forming the screw-thread in the spindle-opening, and the side-taps are at the same time forming the screw-threads in the ends of the valve. When the valve-seat has been sufficiently formed the pressure is removed from the lever I and the cutter G ceases to operate upon the metal, and when the screw-thread is cut of sufficient depth the machine is reversed and the taps run out. The cutter G may be made of such thickness that it will be pressed against the valve-seat by the end of the tap E as it enters the opening to form the thread, and the pressure removed when the tap is withdrawn; in this manner the seats of the valves will be accurately bored and all will be faced alike. As the motion of the shaft F is independent of the motion of the tap-spindle, the cutter G can be operated with such speed that it will work in advance of the tap sufficiently far as not to interfere with the latter, and it will be observed that by making the tap E hollow and arranging the cutter G with its shaft F through the center of the tap, their axles are made to coincide, so that in the operation of the machine the valve-seats will be faced off square and true with the opening into which the valve-spindle is fitted; and consequently when the latter is arranged in position the valve-pad will fit accurately upon the face of the seat. Then, again, by tapping the ends of the valve at the same time that the spindle-opening is tapped and the seat bored, all of said parts are formed true and accurate with each other. This is a matter of great importance, as it greatly facilitates the operations of putting up piping and arranging the valves therein. The valves can, by employing this manner of boring and tapping, be constructed very rapidly and their cost greatly reduced, while the valves so constructed are far superior to those produced in the ordinary manner. It will be understood that when angle-valves are to be bored and tapped, the hollow tap E and seat-cutter G will be changed to the side of the machine, or to one the position indicated by the dotted lines in Fig. 1; and the tapping-machines may be so constructed that all of the tapping-spindles will be interchangeable, so that the required changes can be effected by simply removing the bolts or screws $e\,e$ and $f\,f$ when the tap-spindle can be withdrawn from the hub of the gear and inserted in the hub of the gear at the side.

Having described my improved mechanism for tapping and boring valves, what I claim therein as new and of my invention, and desire to secure by Letters Patent, is—

The combination, with the hollow screw-tap E and the concentric boring-cutter G, supported upon a shaft, F, passing through said tap, of mechanism substantially such as shown and described, for operating the same, whereby each shall have rotary and lengthwise movements independent of the other, for the purposes set forth.

JOHN GUNN.

Witnesses:
   THOS. H. DODGE,
   CHAS. H. BURLEIGH.